Feb. 11, 1969   R. O. JOHANSSON   3,426,993
SHELF BRACKETS
Filed March 23, 1967   Sheet _1_ of 2

INVENTOR
RUNE OSKAR JOHANSSON

BY Linton and Linton
ATTORNEYS

United States Patent Office 3,426,993
Patented Feb. 11, 1969

3,426,993
SHELF BRACKETS
Rune Oskar Johansson, Kommendorsgatan 30,
Goteborg, Sweden
Filed Mar. 23, 1967, Ser. No. 625,478
Claims priority, application Sweden, Mar. 28, 1966,
4,055/66
U.S. Cl. 248—242    3 Claims
Int. Cl. A47b 96/10

ABSTRACT OF THE DISCLOSURE

The present shelf bracket is for attachment to vertical supporting rails and includes a coupling member detachably connectable to the vertical supporting rail and a bracket member detachably connectable to said coupling member in various positions of inclination of said bracket member.

---

The present invention relates to shelf brackets of the kind adapted to be detachably carried by vertical supporting rails.

It is often requested that these brackets shall be capable of being attached to the supporting rails in various positions of inclination, and in order to meet the demands in this respect and also in respect of various bracket sizes etc., it has been necessary to manufacture and keep in stock brackets of a multitude of various forms and sizes which has made the stock-keeping expensive.

The invention which has for its object to overcome this inconvenience is characterized in having a bracket member and for attaching the bracket member to the supporting rail there is provided a coupling member which is detachably connectable to said rail with the bracket member being detachably connectable to said coupling member in various positions of inclination.

The coupling member need only be manufactured in a single model, and apart from size the brackets are identical and easy to manufacture so that the manufacturing and stock-keeping will be less expensive.

The coupling member is preferably made in the form of a plate which is provided at one edge with hooks insertable into openings in the supporting rail and provided at an opposite edge with a number of notches serving as seats for a first pin projecting laterally from the bracket member and further provided with an opening disposed between said hooks and notches and serving as a seat for a second pin projecting from the bracket member in the same direction as the first-mentioned pin.

The two pins are preferably provided with enlarged heads and the opening for said other pin is preferably elongated in a direction substantially at right angles to that edge of the plate which is provided with the notches for said first pin, said opening being provided at its end adjacent said edge with an enlarged portion permitting the head of the pin to be inserted therethrough.

Figure 1:
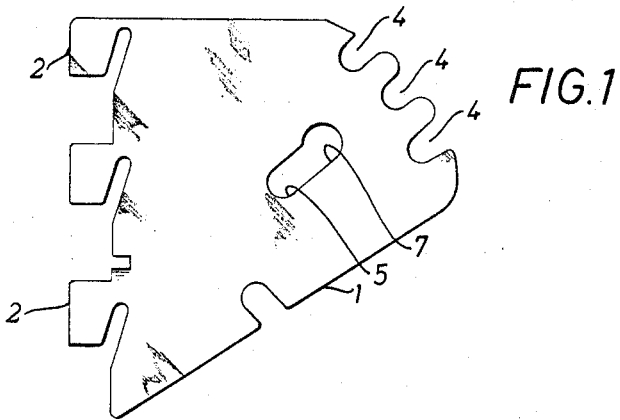
Figure 2:
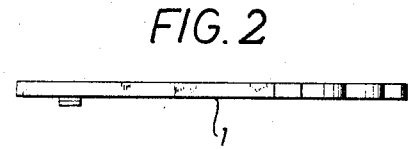
Figure 4:
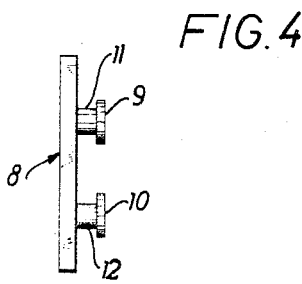
Figure 3:
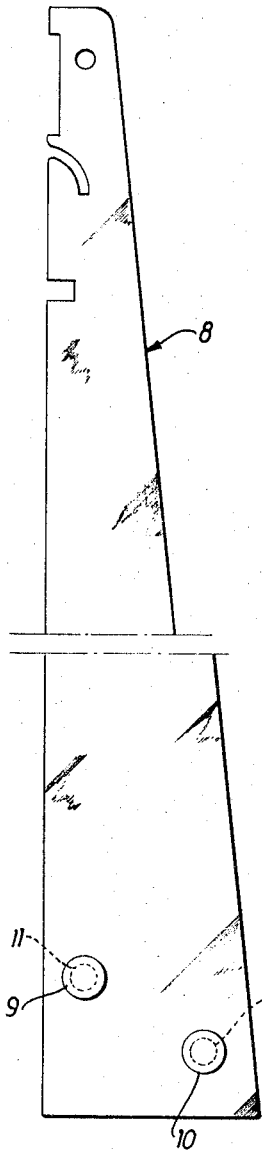
Figure 5:
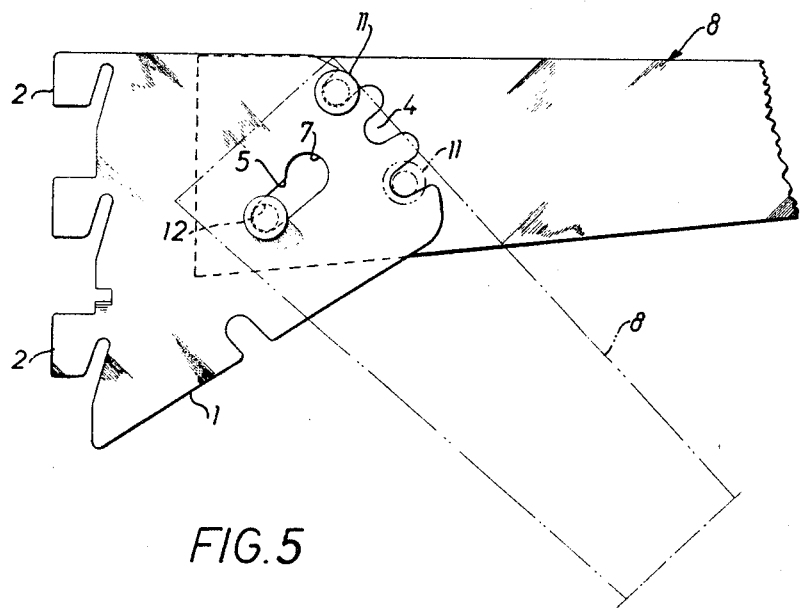

One embodiment of the invention is illustrated in the accompanying drawings, wherein:

FIGURES 1 and 2 show the coupling member in two projections at right angles to one another, FIGURES 3 and 4 illustrate a bracket member likewise in two projections at right angles to one another, and FIGURE 5 is a side view of a coupling member according to the invention and showing a portion of a bracket member attached thereto.

The coupling member is in the form of a plate 1 which is provided at one edge with a number of hook-shaped projections 2 intended to be inserted in known manner into slots in a conventional supporting rail (not shown in the drawings) so that the coupling member will be supported by the supporting rail. At that edge of the plate which is opposite the edge provided with the projections 2 the plate is provided with a series of notches 4 distributed along said edge, and between said two edges the plate is provided with an opening 5 which is elongated in a direction at right angles to the edge of the plate provided with the notches 4 and which has an enlarged portion 7 at the end adjacent said last-mentioned edge. The bracket member is made in the form of an elongate tapered plate 8 which is provided adjacent its wider end with two pins 11 and 12 projecting towards the same side and provided with enlarged heads 9 and 10, respectively, said pins being displaced relative to one another in the longitudinal direction of the bracket member as well as across the bracket member in such a manner that, in a horizontal position of use of the bracket member, the lower pin 12 is closer to the wider end of the bracket member than the other pin 11.

The distance between the pins 11 and 12 is so chosen with respect to the notches 4 and the enlargement 7 of the elongate opening 5 that after the pin 12 has been inserted into the enlargement 7 the bracket member may be swung relative to the plate 1 into the desired position, and by displacing the bracket member in a direction towards the edge of the plate provided with the hooks 2, thereby displacing the pin 12 in the opening 5, the pin 11 may be inserted in the notch 4 situated in front thereof and serving as a seat for the pin 11, so that the bracket member will be securely attached to the plate 1 in the desired position of inclination. In FIGURE 5 the bracket member is shown in full lines adjusted to horizontal position and in broken lines in a downwardly inclined position.

What I claim is:

1. A shelf support of the kind adapted to be carried by a vertical supporting rail, characterized in that for attaching the support to the supporting rail there is provided a coupling member which is detachably connectable to said rail, a bracket member comprising an elongated plate like element having means at one end for supporting a shelf, and means at the other end for attachment to said coupling member, said attachment means comprising first and second pins projecting laterally from said element for attachment to said coupling member in various positions of inclination, said coupling member is in the form of a plate which is provided at one edge with hooks insertable into openings in the supporting rail and provided at an opposite edge with a number of notches opening outwardly and serving as seats for said first pin and further provided with an opening disposed between said hooks and notches and serving as a seat for said second pin.

2. A bracket as claimed in claim 1, characterized in that the pins are provided with enlarged heads.

3. A bracket as claimed in claim 2, characterized in that the opening for said second pin is elongated in a direction substantially at right angles to that edge of the plate which is provided with the notches for said first pin, said opening being provided at its end adjacent said edge with an enlarged portion of key hole form permitting the head of the pin to be inserted therethrough.

References Cited

UNITED STATES PATENTS 945,280  1/1910  Lindberg _____ 248—242

FOREIGN PATENTS 96,460   7/1960   Norway.
939,044  10/1963  Great Britain.
379,079  8/1964   Switzerland.

JOHN PETO, *Primary Examiner.*

U.S. Cl. X.R.

211—135; 248—250